United States Patent [19]

Hibbard

[11] 4,153,985
[45] May 15, 1979

[54] METHOD OF LOOPING ARMATURE COIL LEADS ABOUT COMMUTATOR TANGS

[75] Inventor: Richard L. Hibbard, Rochester, N.Y.

[73] Assignee: Eastman Kodak Company, Rochester, N.Y.

[21] Appl. No.: 791,258

[22] Filed: Apr. 27, 1977

[51] Int. Cl.² .................... H02K 15/09; H01R 43/06
[52] U.S. Cl. ........................................ 29/597; 29/735; 242/7.03; 242/7.05 B
[58] Field of Search ............... 29/597, 598, 735, 732; 242/7.05 B, 7.03, 7.05 C, 7.05 R

[56] References Cited

U.S. PATENT DOCUMENTS

| | | | |
|---|---|---|---|
| 2,779,886 | 1/1957 | Hunsdorf | 242/7.03 |
| 2,947,427 | 8/1960 | Moore | 29/732 |
| 3,163,921 | 1/1965 | Applegate | 29/596 |
| 3,212,171 | 10/1965 | Echter | 29/597 |
| 3,231,206 | 1/1966 | Moore | 29/736 |
| 3,244,917 | 4/1966 | Gute | 310/154 |
| 3,449,827 | 6/1969 | Witzel | 29/597 |
| 3,451,633 | 6/1969 | Markham et al. | 242/7.09 |
| 3,474,515 | 10/1969 | Dammar | 29/732 |
| 3,506,864 | 4/1970 | Miller | 310/234 |
| 3,524,601 | 8/1970 | Biddison et al. | 242/7.03 |
| 3,585,716 | 6/1971 | Steinke | 29/597 |
| 3,628,229 | 12/1971 | Biddison et al. | 29/597 |
| 3,636,621 | 1/1972 | Dammar | 29/597 |
| 3,648,360 | 3/1972 | Tucker | 29/597 |
| 3,713,208 | 1/1973 | Doyle | 29/597 |
| 3,713,209 | 1/1973 | Biddison | 29/597 |
| 3,713,598 | 1/1973 | Bucholtz | 29/597 |
| 3,735,171 | 5/1973 | Van De Griend | 310/235 |
| 3,783,501 | 1/1974 | Biddison et al. | 29/597 |
| 3,785,034 | 1/1974 | Bucholtz | 29/597 |
| 3,857,172 | 12/1974 | George et al. | 29/597 |
| 3,911,563 | 10/1975 | Anderson | 29/597 |
| 3,921,284 | 11/1975 | Bucholtz et al. | 29/597 |
| 3,927,456 | 12/1975 | Dammar | 29/598 |
| 3,927,469 | 12/1975 | Dammar | 29/597 |
| 3,927,843 | 12/1975 | Dammar | 242/7.05 B |

FOREIGN PATENT DOCUMENTS 1420308   1/1976   United Kingdom .............. 242/7.05 B Primary Examiner—C. W. Lanham
Assistant Examiner—Daniel C. Crane
Attorney, Agent, or Firm—J. Morrow

[57] ABSTRACT

A flier-type armature winder winds armatures consisting of a commutator with circumferentially gapped tangs and an armature core, co-axially mounted on a common shaft. In operation, at least one flier winds coils of wire successively onto the armature core and a shield covers the commutator tangs to prevent them from being accidentally engaged by the wire. After each winding of the wire coils, a wire lead from the last wound coil is looped about a corresponding one of the commutator tangs. The wire loop is formed by first securing the wire lead to wire-engaging means located on the shield. Then the shield is moved to substantially align its wire engaging means and the secured wire lead with a first one of first and second gaps in the commutator which are disposed at opposite sides of the corresponding tang. Next, the shield is retracted from the commutator tangs to lay a trailing portion of the wire lead in the first gap. The stretch of wire lead between the first gap and the wire-engaging means is then bent completely across the corresponding tang by rotating the shield to substantially align its wire-engaging means and the secured portion of the wire lead with the second gap. At the same time or subsequently, the bent wire is looped partially about the corresponding tang by returning the shield along its rotational axis to again cover the commutator tangs.

8 Claims, 8 Drawing Figures

1

METHOD OF LOOPING ARMATURE COIL LEADS ABOUT COMMUTATOR TANGS

BACKGROUND OF THE INVENTION

1. Field of the Invention

The present invention relates generally to the winding of armatures for electric motors, generators and the like by means of a flier-type armature winder. More particularly, the invention relates to a method of looping armature coil leads about commutator tangs.

2. Description of the Prior Art

Those versed in the prior art dealing with the subject of armature winding are familiar with flier-type armature winders for winding armatures of the type having a commutator with circumferentially gapped tangs and a slotted armature core, both mounted in axially spaced relation on a common shaft. In operation, the armature winding machine successively winds coils of wire into pairs of slots in the armature core and loops wire leads between the wound coils about corresponding ones of the commutator tangs. A well known example of such an armature winder is disclosed in U.S. Pat. No. 3,713,598, granted Jan. 30, 1973. While a pair of fliers are rotated in opposite directions to individually wind coils of wire onto the armature core, the stretch of wire between each flier and the armature core is prevented from accidentally engaging one of the commutator tangs by a shield which covers the tangs. After each winding of a pair of wire coils by the two fliers, the shield is rotated about the commutator tangs to substantially expose two of the tangs respectively through a pair of slots in the shield. The fliers are then rotated in directions opposite to their directions for winding the wire coils to partially loop the wire leads, between the last wound coils and the fliers, respectively about the exposed tangs. To complete looping of the wire leads about the exposed tangs, the shield is first rotated to cover these tangs and then the fliers are rotated in their winding directions to form the remainder of the wire loop. Covering the exposed tangs before rotating the fliers prevents the wire leads from slipping over the tops of the tangs as the wire leads are pulled forward by the rotated fliers.

It will be observed in this kind of flier-type armature winder, that it is the winding fliers which loop the wire leads from the last wound coils about corresponding ones of the commutator tangs. For many applications, the winding fliers may successfully perform this function. At times, however, the design of the commutator or the character of the wire, particularly heavy wire, is such that the wire leads are not easily looped about the corresponding tangs by the winding fliers. Consequently, as for example disclosed in the earlier cited U.S. Pat. No. 3,713,598, movable guide members have been devised to guide the wire leads about the commutator tangs. While these guide members may be successfully employed, they occasionally can snag the wire leads during rotation of the winding fliers.

A somewhat different approach to armature winding with a flier-type armature winder involves the use of an inner commutator shield and an outer commutator shield, rather than winding fliers, to loop the wire leads about the commutator tangs. Such an approach has been used for several years in a Globe Armature Winder, Model HFA 1-A. According to this approach, between each successive winding of an armature coil by a flier, the flier is rotated in a direction opposite to its direction for winding coils to lay a wire lead from the last wound coil against the outer shield. The inner shield is then rotated to position a slot in its peripheral end portion over a first one of first and second gaps in the commutator, the gaps being disposed at opposite sides of a commutator tang which corresponds to the last wound coil. The outer shield is then rotated about the inner shield until a projecting fin member of the outer shield pushes the wire lead immediately over the slot in the inner shield; whereupon, an intermediate portion of the wire lead drops through the slot into the first gap. The inner shield is then rotated to move its slot with the wire lead from their location over the first gap to another location over the second gap, i.e., the next succeeding gap alongside the corresponding tang. Such rotation of the inner shield bends a trailing portion of the wire lead completely across a rear face of the corresponding tang. Then, the outer shield is rotated again to cause an inclined edge of the outer shield to push the wire lead out of the slot in the inner shield; whereupon, an open loop is formed about the corresponding tang.

While flier-type armature winders which include cooperating inner and outer shields for looping the wire leads about the commutator tangs have been used for a number of years, it will be recognized that such winders suffer from several disadvantages. For example, the inclined edge of the outer shield (which pushes the wire lead out of the slot in the inner shield) may cooperate with the slot defining edges of the inner shield in the manner of a scissors to cut the wire lead while it is in the slot. Moreover, the insulation covering of the wire lead may flake off in parts which can find their way between the inner and outer shields to eventually jam these shields.

SUMMARY OF THE INVENTION

These and other problems associated with different kinds of flier-type armature winders are solved in accordance with the present invention of a method of looping armature coil leads about commutator tangs, using a single shield construction in a flier-type armature winder. Basically, the invention provides for coupling an armature coil lead to a single shield and then causing relative rotation and translation between the shield and the commutator tangs to loop the wire lead about a corresponding one of the tangs.

According to a preferred embodiment of the present invention, at least one flier is rotated in a direction opposite to its direction for successively winding armature coils to lay a wire lead, between the last wound coil and the flier, against a peripheral end portion of the single shield. The end portion of the shield is dispersed to overlay the commutator tangs. To couple the wire lead to the shield, the shield is rotated about the commutator tangs until a notch, i.e., a relieved area, in its end portion is positioned opposite the wire lead. This permits the wire lead, which is tensioned, to move into the notch. Then the shield is rotated to position the notch and the coupled portion of the wire lead immediately over a first one of first and second gaps in the commutator, such gaps being disposed at opposite sides of a tang which corresponds to the last wound coil. Next, the shield is retracted along its rotational axis from the commutator to lay a trailing portion of the wire lead in the first gap. The stretch of wire lead between the first gap and the notch is then bent completely across the corresponding tang by rotating the shield to substantially align the notch and the coupled wire portion with the second, next succeeding gap. At the same time or subsequently, the bent wire is looped about the corresponding tang by returning the shield along its rotational axis to again cover the commutator tangs.

Since there is only one shield in the preferred embodiment, which is retracted from the commutator tangs to initiate looping of a wire lead about a corresponding tang, there is little or no danger of cutting the wire lead as in one of the foregoing prior art examples. Moreover, since the shield affirmatively loops the wire lead about the corresponding tang, there is no need for wire guides as in the other prior art example.

BRIEF DESCRIPTION OF THE DRAWINGS

For a more complete understanding of the present invention, as well as further advantages and features thereof, reference should be had to the following detailed description of the invention taken in conjunction with the accompanying drawings, in which:

in FIG. 2, the machine members illustrated are one of the winding fliers and a single shield which covers the commutator tangs of the armature (which is indexed 60° from its angular orientation in FIG. 1);

FIG. 3 shows the winding flier rotated in a direction opposite to its direction for windng coils to lay the wire lead on the shield;

FIG. 4 shows the wire lead located in a notch in the shield;

FIG. 5 shows the shield retracted from the commutator tangs to lay the wire lead in a commutator gap disposed alongside the one tang about which the wire lead is to be looped;

FIG. 6 shows the shield partially rotated and returned to cover the commutator tangs, causing the wire lead to be partially looped about the one tang.

FIG. 7 shows the shield completely rotated to position its notch, with the wire lead, for winding of the next coil.

DESCRIPTION OF THE PREFERRED EMBODIMENT

Figure 1:
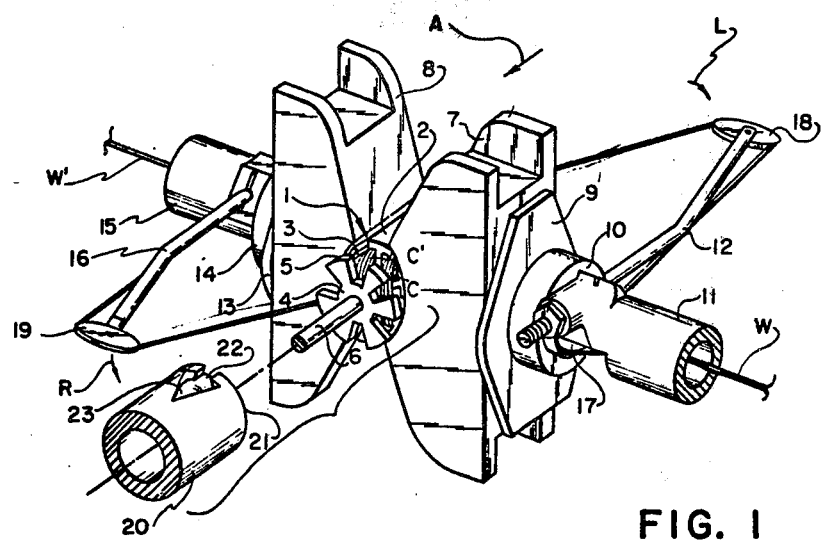
FIG. 1 is a partially exploded perspective view of a portion of a double flier armature winding machine and is a perspective view of an armature being wound in the machine by a pair of rotating fliers, the armature being shown with only two wire coils wound on it.

Referring now to the drawings, there is shown in FIG. 1, an armature generally designated by the reference number 1. The armature is of the type consisting of an armature core 2 having radially directed coil receiving slots 3 and a disc-like commutator 4 having a plurality of circumferentially gapped segments or tangs 5. Both the armature core 2 and the commutator 4 are mounted in axially spaced relation on common shaft 6.

A portion of a double flier winding machine used for winding the armature 1 is shown in FIG. 1. As viewed in the direction of the arrow A in FIG. 1, the winding machine includes a pair of left-side and right-side winding forms 7 and 8, respectively. The left-side winding form 7 is fixed to a mounting plate 9, which is fixed to a bearing housing 10. The bearing housing 10 rotatably supports a flier spindle 11 to which is secured a left-side flier 12. Similarly, the right-side winding form 8 is fixed to a mounting plate 13, which is fixed to a bearing housing 14. The bearing housing 14 rotatably supports a flier spindle 15 to which is secured a right-side flier 16.

Conventional armature winding wire W is drawn off a left-side supply reel (not shown) and coursed through the spindle 11 around a pulley 17, mounted for rotation on the spindle, and around another pulley 18, mounted for rotation on the free end of the left-side flier 12. At the same time, another strand of wire W' is similarly drawn off a right-side supply reel (not shown) and coursed from the spindle 15 around a spindle mounted pulley (not shown) and, thence, around a pulley 19 of the right-side flier 16. As well known to those skilled in the art, the left-side and right-side fliers 12 and 16 may be rotated to successively wind coils of the wires W and W', two at a time, into pairs of the slots 3 in the armature core 2. In FIG. 1, two coils C and C' are shown respectively wound into two pairs of the core slots 3. Appropriate machine devices (not shown) are provided for spreading the winding forms 7 and 8 apart when an armature is inserted or removed, for rotating the fliers 12 and 16 in proper time relation, and for indexing or rotating the armature 1 as required to present new pairs of slots in position to receive wire coils wound by the fliers.

Figures 2, 3:
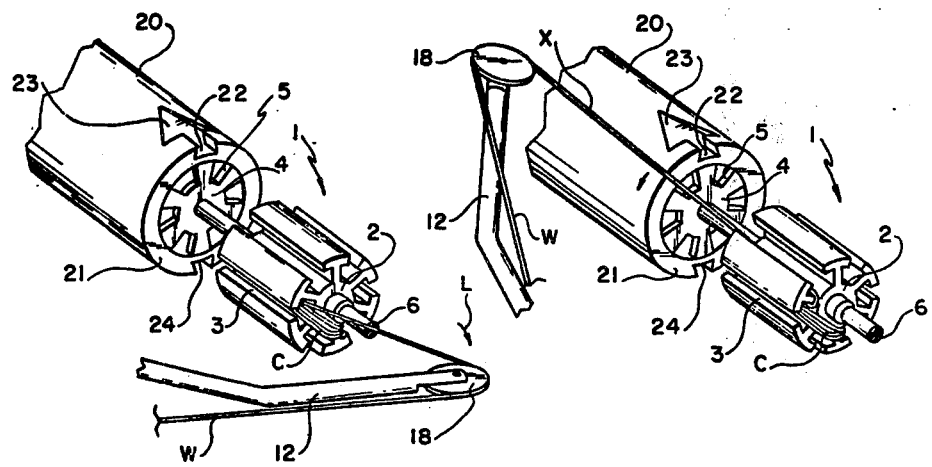
FIG. 2 is a perspective view of the armature being wound and of certain members of the winding machine as seen in the direction of the arrow A in FIG. 1.
FIGS. 3–7 are perspective views of the same elements illustrated in FIG. 2, showing in sequence the operational steps for looping the wire lead from an armature coil about a corresponding one of the commutator tangs.

During intervals in which the left-side and right-side fliers 12 and 16 are rotated to wind a pair of armature coils, it is necessary to shield the commutator tangs 5 to prevent stretches of the wires W and W' between the fliers and the armature core 2 from being accidentally engaged by the commutator tangs. For this purpose, a hollow cylindrical shield 20 is shown in FIGS. 1 and 2, which, during winding by the fliers 12 and 16, is positioned with its peripheral end portion 21 surrounding the commutator tangs 5. After each winding of a pair of armature coils by the fliers, when it is desired to loop wire leads between the fliers and the last wound coils about corresponding ones of the commutator tangs 5, the shield 20 is retracted from the commutator. According to the present invention, the shield 20 then operates to affirmatively loop the wire leads about the commutator tangs 5. This other purpose of the shield is explained in detail below.

Referring again to FIG. 1, the left-side and right-side fliers 12 and 16 are rotated in opposite directions, indicated by the arrows L and R, to wind the armature coils C and C'. As viewed in the direction of the arrow A in FIG. 1, the left-side flier 12 rotates in what is commonly known as a "top-coming" direction L and the right-side flier 16 rotates in what is commonly known as a "top-going" direction R to wind the armature coils. For purposes of describing the invention, however, the respective operations of the two fliers 12 and 16 may be identical. Therefore, the description of the invention which follows is made only with reference to the left-side flier 12, it being understood that the right-side flier 16 would operate in an identical manner.

Figure 4:
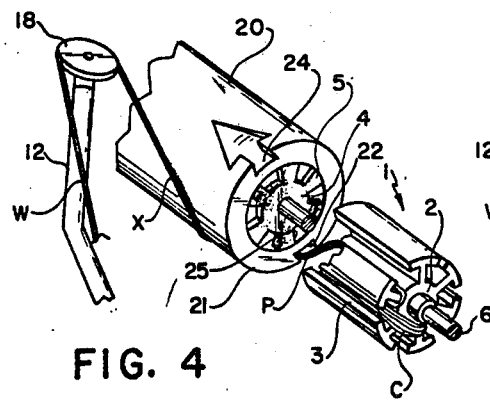
Figure 5:
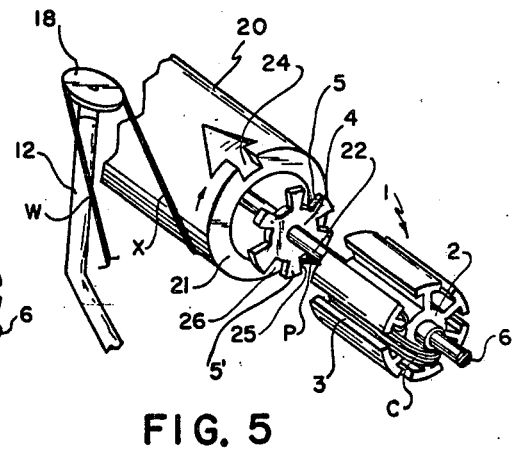
Figure 6:
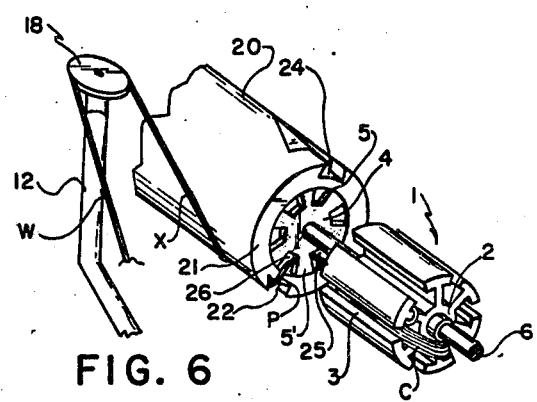
Figure 7:
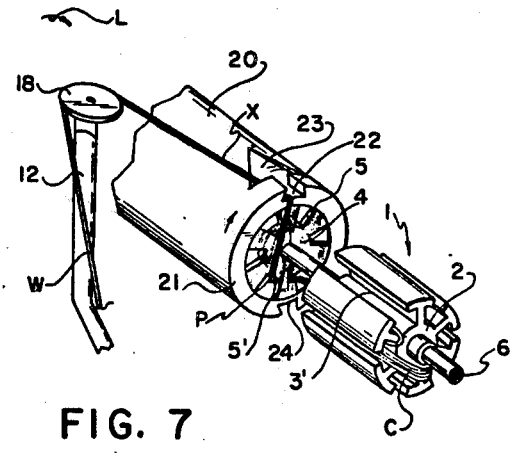

In FIG. 1, the left-side flier 12 is shown approximately where it would be located after winding the armature coil C. After such winding, the armature 1 is indexed or rotated 60°, i.e., the angle between each of the core slots 3. Such rotation of the armature 1 is in a counterclockwise direction, as viewed in the direction of the arrow A in FIG. 1, to the angular orientation shown in FIG. 2. The left-side flier 12 is then rotated approximately 180°, in the direction opposite to its "top-coming" direction L for winding the coil C, to lay a tensioned wire lead X extending between the wound coil C and the left-side flier against the peripheral end portion 21 of the shield 20, as shown in FIG. 3. The shield 20 is then rotated approximately 210°, in a counterclockwise direction as viewed in FIG. 3, to the angular orientation shown in FIG. 4. Approximately halfway through this rotation, a notch 22 in the shield end portion 21 is moved into alignment with the tensioned wire lead X; whereupon, the wire lead drops into the notch, and is thereby effectively coupled to the shield 20 for rotational movement therewith. As best shown in FIG. 7, a relieved area 23 of the shield 20, located behind the notch 22, facilitates seating of the wire lead X in the notch. Diametrically opposite the notch 22, there is shown an identical notch 24 in the shield end portion 21. This notch 24 serves to couple a tensioned wire lead (not shown) extending between the wound coil C' and the right-side flier 16 to the shield, in the same way as described for the notch 22. At the angular orientation shown in FIG. 4, the shield 20 is positioned with its notch 22 and an intermediate portion P of the tensioned wire lead X directly opposite a gap 25 in the commutator 4. The wire portion P is then laid in the gap 25 as shown in FIG. 5, by retracting the shield 20 along its axis of rotation to uncover the commutator tangs 5. The shield 20 does not rotate as it is being retracted from the commutator tangs 5 and, therefore, its notch 22 remains substantially in alignment with the gap 25. Next, the shield 20 is rotated clockwise as viewed in FIG. 5, through an angle of approximately 60°, i.e., the angle subtended by the distance between two corresponding points respectively in the gap 25 and a gap 26. This serves to bend the wire portion P completely across a commutator tang 5'. During the final 20° of rotation of the shield 20, the shield is returned along its rotational axis to again cover the commutator tangs 5. This combined rotation and translation of the shield 20 positions its notch 22 with the wire lead X over the gap 26 in the commutator 4, as shown in FIG. 6. Moreover, the combined rotation and translation of the shield serves to loop the wire portion P partially about the corresponding tang 5'. Of course, it will be realized that the same result can be achieved by first rotating the shield for the complete 60° and then translating the shield as described.

Figure 8:
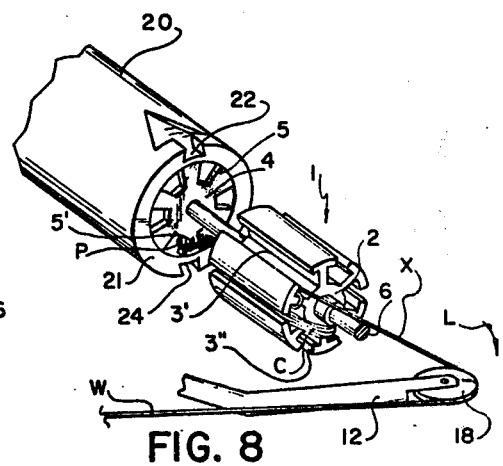
FIG. 8 shows the winding flier rotated in its winding direction to remove the wire lead from the notch.

As shown in FIG. 7, continued rotation of the shield 20 for approximately 150° more in the clockwise direction returns the shield to its original position. In this position, the notch 22 with the wire lead X is located in alignment with an unwound armature core slot 3' into which the left-side flier 12 next winds the wire W. To release the wire lead X from the notch the left-side flier 12 is then rotated in its "top-coming" direction L. This serves to release the wire lead X from the notch 22 and to lay the wire lead in the unwound slot 3' as shown in FIG. 8. Continued rotation of the flier 12 in the direction L will then wind a wire coil in the core slot 3' and another core slot 3".

The invention has been described in detail with particular reference to preferred embodiments thereof, but it will be understood that variations and modifications can be effected within the spirit and scope of the invention.

I claim:

1. In an armature winding method wherein an unwound armature having a commutator with circumferentially gapped tangs is placed in an armature winding machine in which a flier successively winds coils of wire onto the armature while a shield covers the commutator tangs, and wherein after each winding by the flier a wire lead extending from the last wound coil to the flier is looped about an exposed corresponding one of the tangs, the steps for looping the wire lead about the corresponding tang comprising:
   after a coil is wound, coupling the wire lead extending between the wound coil and the flier to wire-engaging means on the shield;
   positioning the wire-engaging means to which the wire lead is coupled over a first one of first and second gaps in the commutator located respectively at opposite sides of a tang corresponding to the wound coil, by effecting relative movement between the commutator and the shield;
   laying the wire lead in the first gap by effecting relative translation between the commutator and the wire-engaging means as the shield is retracted to uncover the tangs; and
   forming a loop about the corresponding tang in a portion of the wire lead which extends between the first commutator gap and the wire engaging means by effecting relative rotation between the commutator and the shield through an angle substantially equal to an angle subtended by the distance between two corresponding points respectively in the first and second gaps and by effecting relative translation between the commutator and the shield until the wire-engaging means is positioned over the second commutator gap.

2. The method steps as recited in claim 1, wherein the wire lead extending between the wound coil and the flier is coupled to the wire-engaging means by first laying the wire lead against the exterior surface of the shield and by then moving the shield to bring the wire-engaging means into engagement with the wire lead.

3. The method steps as recited in claim 1, wherein the wire-engaging means is formed by a notch in the exterior surface of the shield and wherein the wire lead extending between the wound coil and the flier is coupled to the wire-extending means by first laying the wire lead against the exterior surface of the shield and by then moving the shield to position the notch opposite the wire lead to permit the wire lead to move into the notch.

4. In an armature winding method wherein an unwound armature having a commutator with circumferentially gapped tangs is placed in an armature winding machine in which a flier successively winds coils of wire onto the armature while a shield covers the commutator tangs, and wherein after each winding by the flier a wire lead extending from the last wound coil to the flier is looped about an exposed corresponding one of the tangs, the steps for looping the wire lead about the corresponding tang comprising:
   after a coil is wound, coupling the wire lead extending between the wound coil and the flier to wire-engaging means on the shield;
   substantially aligning the wire-engaging means to which the wire lead is coupled and one of two gaps in the commutator located respectively at opposite sides of a tang corresponding to the wound coil, by effecting relative movement between the commutator and the shield;

laying the wire lead in the one gap by effecting relative translation between the commutator and the wire-engaging means as the shield is retracted from the commutator to uncover the tangs;

bending the wire lead across the corresponding tang by effecting relative rotation between the commutator and the shield through an angle substantially equal to an angle subtended by the distance between two points respectively in the two gaps at opposite sides of the corresponding tang;

looping the bent wire lead about the corresponding tang by effecting relative translation between the commutator and the shield along their rotational axis at least until the shield again covers the tangs; and releasing the wire lead from the wire-engaging means to enable the flier to wind another coil.

5. In an armature winding method wherein an unwound armature having a slotted core and a commutator with circumferentially gapped tangs is placed in an armature winding machine in which a flier successively winds coils of wire into pairs of slots in the armature core while a peripheral end portion of a shield covers the commutator tangs, and wherein after each winding by the flier a wire lead extending from the last wound coil to the flier is looped about an exposed corresponding one of the tangs, the steps for looping the wire lead about the corresponding tang comprising:

after a coil is wound, laying the wire lead extending between the wound coil and the flier against the peripheral end portion of the shield;

coupling the wire lead to the shield by rotating the shield to move wire-engaging means on its end portion into engagement with the wire lead;

positioning the wire-engaging means to which the wire lead is engaged over a first one of first and second gaps in the commutator located respectively at opposite sides of a tang corresponding to the wound coil, by continuing to rotate the shield in its direction for engaging the wire lead;

laying the wire lead in the first gap by effecting relative translation between the commutator and the wire-engaging means as the shield is retracted from the commutator to uncover the tangs;

bending the wire lead across the corresponding tang by rotating the shield in a direction opposite to its direction for coupling the wire lead and through an angle substantially equal to an angle subtended by the distance between two corresponding points respectively in the first and second gaps;

looping the bent wire lead about the corresponding tang by translating the shield along its rotational axis to position the wire-engaging means over the second commutator gap; and releasing the wire lead from the wire-engaging means to enable the flier to wind another coil.

6. The method steps as recited in claim 5, further comprising the step of:

before releasing the wire lead, continuing to rotate the shield in its direction for bending the wire lead until the wire-engaging means is positioned opposite an armature core slot into which the flier next winds another coil.

7. The method steps as recited in claim 5, wherein at least the final segment of rotation of the shield in its direction for bending the wire lead takes place simultaneously with the return of the shield along its rotational axis to position the wire-engaging means over the second gap.

8. In an armature winding method wherein an unwound armature having a slotted core and a commutator with circumferentially gapped tangs is placed in an armature winding machine in which a flier successively winds coils of wire into pairs of slots in the armature core while a peripheral end portion of a shield covers the commutator tangs, and wherein after each winding by the flier a wire lead extending from the last wound coil to the flier is looped about an exposed corresponding one of the tangs, the steps for looping the wire lead about the corresponding tang comprising:

after a coil is wound, laying the wire lead extending between the wound coil and the flier against the peripheral end portion of the shield by rotating the flier in a direction opposite to its direction for winding coils;

coupling the wire lead to the shield by rotating the shield to position a notch in its end portion beneath the wire lead and permit the wire lead to drop into the notch;

positioning the notch with the wire lead over a first one of first and second gaps in the commutator located respectively at opposite sides of a tang corresponding to the wound coil, by continuing to rotate the shield;

laying the wire lead in the first gap by retracting the shield along its rotational axis in a direction away from the commutator to uncover the tangs and to effect relative translation between the commutator and the notch;

bending the wire lead across the corresponding tang by rotating the shield in a direction opposite to its direction for coupling the wire lead and through an angle substantially equal to an angle subtended by the distance between two corresponding points respectively in the first and second gaps;

looping the bent wire lead about the corresponding tang by translating the shield along its rotational axis to position the notch with the wire lead over the second commutator gap;

positioning the notch with the wire lead opposite an armature core slot into which the flier next winds the wire, by continuing to rotate the shield; and releasing the wire lead from the notch by rotating the flier in its direction for winding coils.

* * * * *